United States Patent [19]

Bissonnette et al.

[11] Patent Number: 5,560,395
[45] Date of Patent: Oct. 1, 1996

[54] APPARATUS AND METHOD FOR REPAIRING UNDERGROUND CONDUITS IN SITU

[76] Inventors: Roger A. Bissonnette, 630 des Tourterelles, St-Nicholas, Quebec, Canada, G0S 2Z0; Jean F. L. Bissonnette, 1649 de Launay, Ste-Foy, Quebec, Canada, G1W 3Z1

[21] Appl. No.: 314,394

[22] Filed: Sep. 28, 1994

[51] Int. Cl.$^6$ .............................. B32B 1/08; F16L 55/162
[52] U.S. Cl. ....................... 138/98; 138/141; 428/36.2; 428/36.8; 428/36.91; 156/294
[58] Field of Search .................................. 156/285, 287, 156/156, 294; 138/93, 97, 98, 141; 405/146, 150.1; 264/516, 269; 29/421.1; 428/36.2, 36.8, 36.91

[56] References Cited

U.S. PATENT DOCUMENTS

| | | | |
|---|---|---|---|
| 4,069,573 | 1/1978 | Rogers, Jr. et al. | 29/421 R |
| 4,588,467 | 5/1986 | Tani et al. | 156/294 |
| 4,645,557 | 2/1987 | Pederson | 156/294 X |
| 4,647,072 | 3/1987 | Westman | 285/15 |
| 4,714,095 | 12/1987 | Muller et al. | 138/98 |
| 4,754,781 | 7/1988 | Jan de Putter | 138/97 X |
| 4,768,562 | 9/1988 | Strand | 128/98 |
| 4,778,553 | 10/1988 | Wood | 156/287 |
| 4,861,634 | 8/1989 | Renaud | 156/287 X |
| 4,995,929 | 2/1991 | Menzel | 156/294 |
| 5,049,003 | 9/1991 | Barton | 405/154 |
| 5,119,862 | 6/1992 | Maimets et al. | 138/98 |
| 5,186,215 | 2/1993 | Gilleland | 138/98 |
| 5,190,705 | 3/1993 | Corazza | 138/97 |
| 5,199,463 | 4/1993 | Lippiatt | 138/98 |
| 5,203,377 | 4/1993 | Harrington | 138/97 |

FOREIGN PATENT DOCUMENTS

| | | | |
|---|---|---|---|
| 3502603 | 7/1986 | Germany | 156/287 |
| 54-106923 | 8/1979 | Japan | 138/97 |

*Primary Examiner*—Daniel J. Stemmer
*Attorney, Agent, or Firm*—James H. Beusse

[57] ABSTRACT

An insert system for repairing defects in underground conduits in situ comprises a tubular inner liner of stiff material having a generally smooth inner surface and a plurality of integral outer circumscribing ribs defining a plurality of valleys between the ribs. An outer sleeve circumscribes the inner liner and is formed of an elastomeric material. A mid-layer of reinforcing woven material is wrapped about the inner liner within the outer sleeve. A hardenable resin saturates the mid-layer and fills the valleys. The resin bonds to the inner liner to form a structural insert, and the outer sleeve provides a deformable seal against an inner surface of a conduit when the insert system is operatively positioned.

19 Claims, 2 Drawing Sheets

5,560,395

APPARATUS AND METHOD FOR REPAIRING UNDERGROUND CONDUITS IN SITU

FIELD OF THE INVENTION

The present invention relates to the repair of sewer pipes, conduits and low pressure pipes without excavation or replacement using insert liners.

BACKGROUND OF THE INVENTION

Sewer pipes and buried conduits often become cracked or broken after long periods of time spent underground. Previously, in order to repair such cracks and breaks, the pipes and conduits would have to be replaced. Replacement involved excavating the pipe or conduit from the ground and burying a new section. This process was expensive and time consuming, and also required the pipe or conduit to be out of service for long periods of time. Methods for repairing cracks and breaks in conduits and pipes were developed whereby the conduits or pipes need not be excavated in order to be repaired. These methods included the use of inserts to act as new conduit and pipe walls.

Methods for repairing conduits using inserts are well known. Known inserts use mechanical as well as chemical means for creating and bonding the insert to the repaired pipe. Methods and apparatus have also been disclosed that use resin impregnated fibrous material to repair cracks and fissures in conduits and low pressure pipes, such as that disclosed in U.S. Pat. No. 5,049,003. These methods call for a single layer matting material to be impregnated with uncured resin, drawn into the conduit, expanded with an inflation device and left to cure. Because the curing process is extended (as much as 24 hours) and the site must be attended during the entire process, some methods call for heat to be applied to the resin impregnated matting by means of hot water or hot air pumped continually through the inflation device. There are significant drawbacks to these methods. First, the single layer matting material must be coated on the inside with a releasing agent to permit release of the inflation device once the resin has cured. Second, the resin impregnated matting material must bond to the surface of the conduit to ensure adequate sealing against leakage. If fluid is leaking into or out of the conduit being repaired, the resin material may wash out of the matting material before it cures or be diluted and neither adequate strength of the liner nor an adequate bond between the insert liner and the conduit may be maintained. Also, during the insertion process, material may accumulate on the outside of the resign impregnated insert matting material, thereby reducing available bonding surface and consequently strength and sealing capabilities of the repair. Also, during the insertion process, void areas where resin is not present can occur in the matting material, thereby causing areas of weakness and areas where the liner fails to properly bond to the conduit.

Finally, some systems call for heating the insert to decrease resin curing time. Unfortunately providing heated water or air for an extended period of time requires a great amount of energy as well as additional equipment in the form of heating devices thereby increasing costs and capital expenditure.

Methods and apparatus calling for multiple layer liner inserts are also well known. These methods generally add a protective coating to the outside of the resin impregnated matting material to protect against accumulation of material during insertion of the insert into the conduit and to prevent wash out during the curing process. Some methods use the outer lining only during transport of the liner into the conduit to be repaired. These methods call for the liner system to be inverted, installed and inverted again to place the resin impregnated material in contact with the inner conduit wall. Problems with these methods include requiring special devices to invert the liner once it has been placed inside the conduit and limitations on ease of use. Other methods and apparatus also call for an inner layer to be added to a liner system to form a three layer insert wherein the inner layer is used to accomplish release and removal of the inflation device, without mandating use of a releasing agent on the insert matting material.

Still other methods are also known wherein electrical wiring and voltage applied thereto is used to generate heat within an insert, such as disclosed in U.S. Pat. No. 4,768,562. In this method a prefabricated hardened resin impregnated liner is heated to allow outward pressure from an inner rubber tube to force a resin impregnated matting material in contact with the inner wall of the conduit to be repaired. The limitation in the prior art regarding material accumulation during insertion, resin voids during curing and wash out are also present in this method. Further, the inflation means (rubber tube) used in this method remains inside the insert, further constricting the conduit, and the electrical wiring used for the heating process is placed within the resin impregnated matting material, adding costs to the matting material. This method does not utilize the heat for quicker curing, but instead, heats the resin to allow pressure from the inner elastomeric tube to expand the resin impregnated material liner to the correct overall interior size of the conduit.

SUMMARY OF THE INVENTION

It is therefore an object of the present invention to overcome the above and other disadvantages of the prior art. It is a further object of this invention to provide a method for repairing sewer pipes, conduits and other low pressure pipes using a three layer insert. It is a still further object of this invention to provide an apparatus for repairing sewer pipes, conduits and other low pressure pipes using a three layer insert wherein an outer layer on the insert protects an inner matting layer from resin wash out and foreign material accumulation, and acts to seal the insert within the conduit at a repair site, resist movement away from that repair site, and resists leakage through and around the repair due to shifting of the conduit over time. It is also an object of this invention to provide a method and apparatus for repairing sewer pipes, conduits and other low pressure pipes using an insert wherein the time for curing of resin within said insert is decreased as a result of heat generated by electrical current forced through an electrically conductive material within a layer of said insert.

In accordance with one form of the present invention there is disclosed a method and apparatus for repairs of cracks, fissures and holes within conduits, sewer pipes and low pressure lines, without requiring the repair of an entire length of pipe from one entry point to another, using one or more multiple layer resin impregnated inserts and decreasing the curing time of said resin by heating the insert liner system through resistive heat generated by current flow through electrical wiring contained in a non-matting material layer of the insert. The system is also usable for joining dissimilar pipes. More particularly, the invention discloses a method and apparatus for a three layer insert wherein an inner layer is made of a plastic material molded to be generally smooth on the inside and with a ribbed surface on the outside, wherein said ribs have electrically conductive material placed within them to form a complete electrical circuit and wherein said ribs act to distribute resin in a resin impregnated matting material throughout the insert liner system and ensure adequate bonding between the inner layer and the matting material. In accordance with a preferred embodiment, this invention further discloses a three layer insert apparatus for repairing sewer pipes, conduits and low pressure pipes wherein the inner layer bonds with a middle layer of resin impregnated fiber matting and wherein an outer layer is made of an elastomeric material that forms a seal for the conduit and acts to add adhesion strength and flexibility to the repair to resist settling in the conduit.

BRIEF DESCRIPTION OF THE DRAWINGS

For a better understanding of the present invention, reference may be had to the following detailed description taken in conjunction with the accompanying drawings in which.

DETAILED DESCRIPTION OF THE PREFERRED EMBODIMENT

Figure 1:
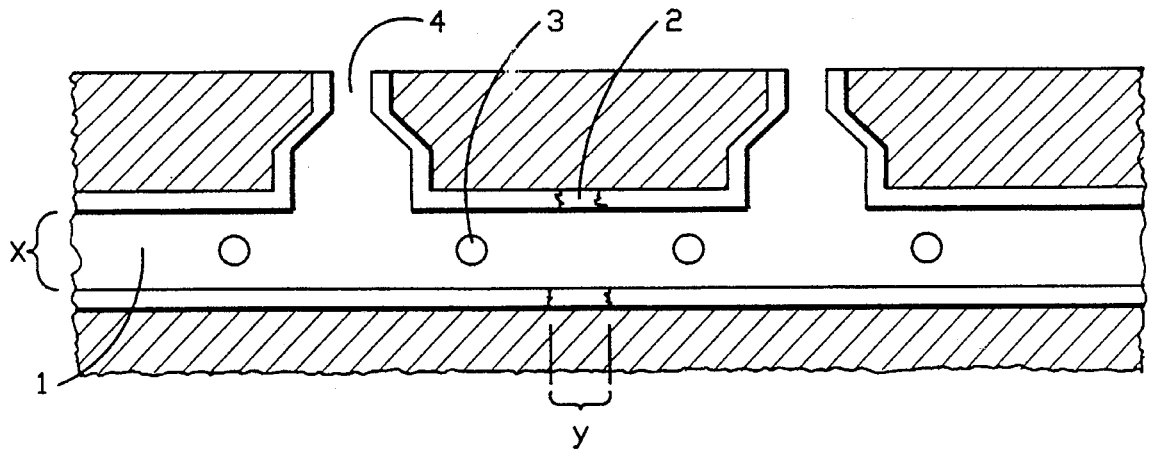
FIG. 1 is a sectional view of a sewer pipe conduit with which the present invention may be used.

Referring now to the drawings, FIG. 1 represents a sewer or low pressure conduit 1, with which the present invention may be used, with means of ingress and egress 4. Discharge openings 3 enter the conduit 1 providing a discharge path for waste from buildings (not shown) proximate to the sewer conduit 1. Crack(s) and fissure(s) 2 have formed in the conduit 1 at a distance from the means of ingress and egress 4 that are to be repaired. During the repair process the location of the crack(s) and fissure(s) 2 is determined by physical inspection or use of a CCD or other type camera. The present invention comprises an insert liner system 16, FIG. 2, and a method for using the liner system 16 to repair crack(s) and fissure(s) 2 in conduit 1. Once the crack(s) and fissure(s) 2 are located, the appropriate length of repair liner system 16 is determined such that the overall length of the liner system 16 is somewhat longer than the length of the area in which the crack(s) and fissure(s) 2 are present. For example, the liner system 16 is longer than distance Y in FIG. 1 but does not overlap openings 3.

Figure 2:
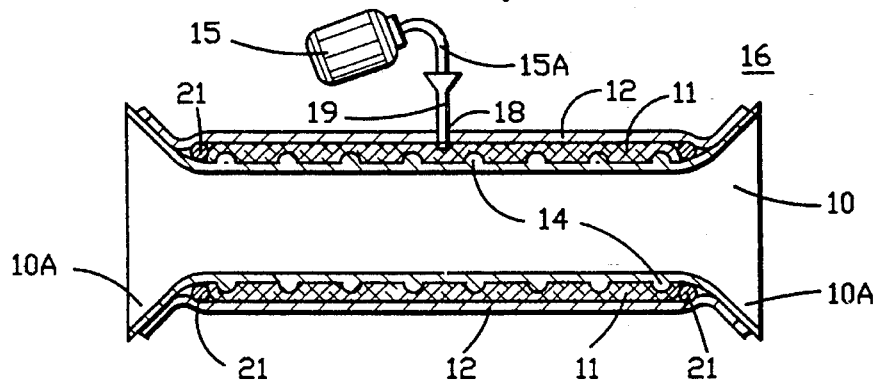
FIG. 2 is a cross sectional view of the three layer insert before insertion into the conduit.
Figure 3:
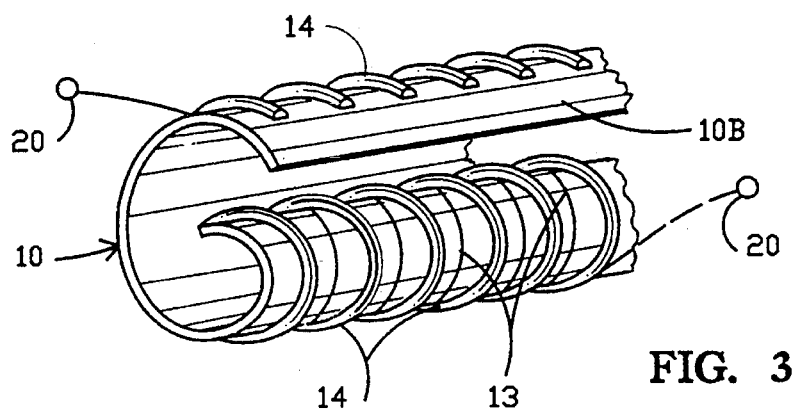
FIG. 3 is a detailed view of the inner layer of the three layer insert.
Figure 4:
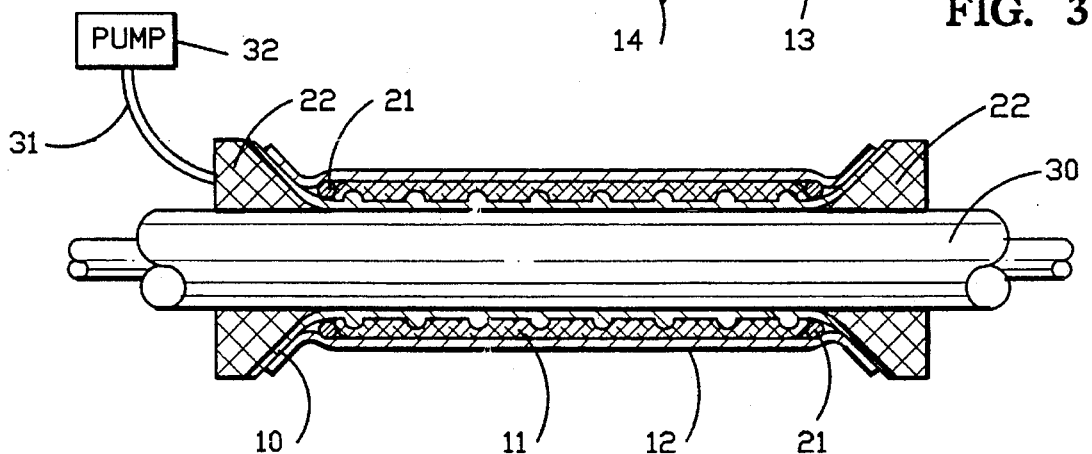
FIG. 4 is a detailed view of the three layer insert with inflation means.
Figure 6:
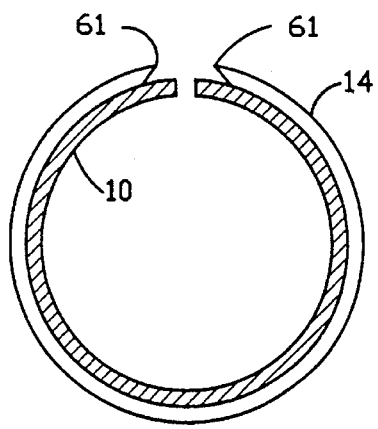
FIG. 6 is a cross sectional view of the inner layer of the three layer insert.
Figure 7:
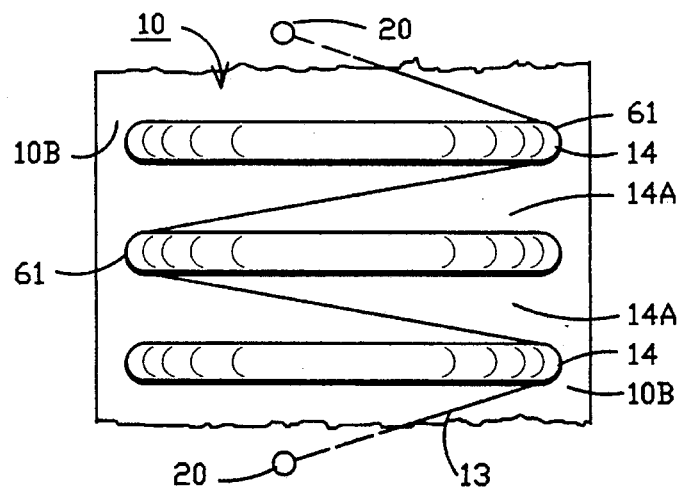
FIG. 7 is outer view of the inner layer of the three layer insert opened to a flat projection.

FIG. 2 illustrates one form of liner system in accordance with the present invention in which the liner system 16 is comprised of three layers. The first of these is an inner layer or hard liner 10 that is generally smooth on the inside surface with a plurality of ribs 14 on the outside surface and is preferably made of a plastic material, such as PVC. Inner liner 10 is preferably formed from a length of a commercially available PVC pipe having a smooth inner surface and an outer surface characterized by a plurality of uniformly spaced, parallel circumscribing ribs. A section of such pipe is cut to an appropriate length, i.e., a length greater than Y, and is then slit axially from end to end. In a preferred form, the inner liner 10 is preformed to a selected length, e.g., 7.5 inches, with flared ends 10A. If a longer insert is required, additional inserts can be abutted against one another. The outer ribs 14 are removed, such as by sanding or buffing, for a circumferential distance of about one inch along each opposite edge of the end-to-end slit to form overlapping joint sections 10B as best seen in FIG. 7. The ends of the ribs 14 are slightly undercut at the buffed area as shown in the end view of FIG. 6. The undercut forms a hooking means 61. A conductive element 13 is wrapped around the outer surface of inner layer 10 in a serpentine fashion, with the element 13 laying in the areas or valleys 14A between adjacent ones of the ribs 14 (FIG. 7). The elements loop around the ribs 14 at the slit and are held in place by the hooking means 61 formed by the bevel undercut at the rib ends adjacent the slit. Conductive element 13 forms a complete electrical path between element end points 20 as shown in FIGS. 3 and 7. The flared ends 10A are not shown in FIGS. 3 or 6.

The diameter of the inner liner or pipe 10 is selected to be slightly greater than the diameter of the pipe to be repaired so as to allow for at least a partial overlap of the edges of the inner liner 10 adjacent the slit. Ideally, the liner 10 is sized such that upon installation of the liner system in a pipe to be repaired, the liner will be finally expanded so that the buffed one inch areas adjacent the slit remain overlapped.

Referring again to FIG. 2, a second layer of the liner system 16 is made of a woven fiber matting 11, such as fiberglass cloth, and is cut to a width equal to approximately the length of the inner liner 10. Preferably, the matting 11 is cut to a length such that it can be wrapped at least twice around the circumference of the inner liner 10. It will be appreciated that the thicknesses of the various layers of insert system 16 are not to scale since layer 11 is substantially thinner than liner 10.

Figure 8A:
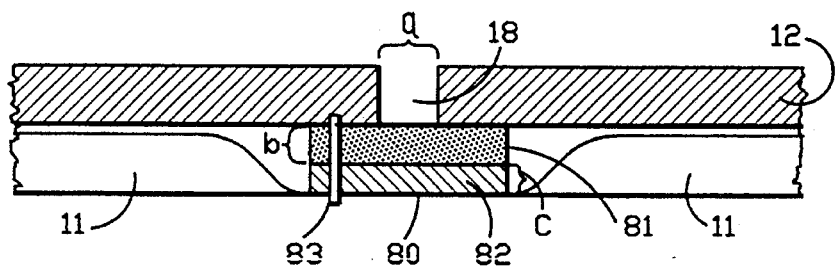
FIGS. 8A and 8B are views of resin port in the outer layer.
Figure 8B:
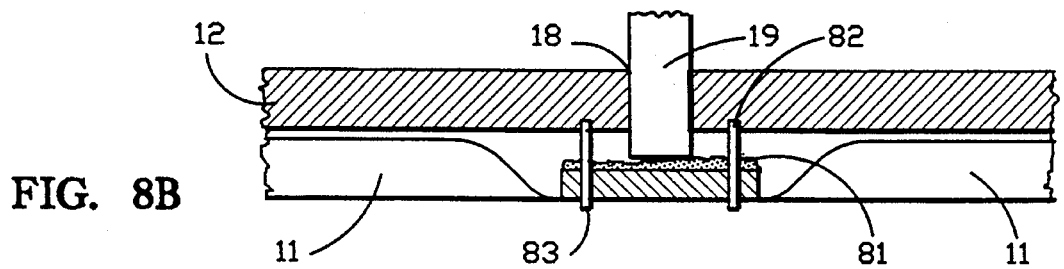

A third outer layer or sleeve 12 is made from ⅛ to 3/16 inch thick (before expansion on the inflation device discussed below) elastomeric material, such as rubber, with one or more preferably approximately ½ inch diameter ports 18 As shown in FIG. 2, the outer sleeve 12 circumscribes the inner layer or or liner 10. The insert system 16 utilizes a hardenable resin to create a solid, strong finished insert. The resin can be a commercially available epoxy resin, polyester resin or other hardenable resin. The port 18 provides an opening for introducing resin, in liquid form, into the assembled insert system 16. As will become apparent, resin poured into port(s) 18 flows around liner 10 and saturates matting 11. The port(s) 18 are preferably blocked to prevent liquid resin from flowing out the port(s). Referring now to FIG. 8A, upon assembly of the insert, and after placement of the outer layer 12 on the fiber matting 11 and inner liner 10 assembly, each port is covered with a valve means 80. In the preferred embodiment, valve means 80 comprises a compressible valve 81, such as foam rubber, held in place via pressure from a two inch square base material 82, such as plastic. Staples 83 pass through the base material 82, and the compressible valve 81 with their protruding points engaging, but not penetrating, outer rubber layer 12 to hold valve means 80 in position overlaying a port 18. Compression of the compressible valve material 81 against layer 12 seals the port 18 so as to prevent leakage of any resin material inside the insert system 16.

At each end of the insert 16 an elastomeric band such as an O-ring or other elastic banding member 21 encircles the matting 11 of the mid-layer compressing it against the outer surface of liner 10. The outer rubber layer or sleeve 12 overlays the member 21 and, due to the elasticity of the sleeve 12, forms a seal against member 21. The members 21 are positioned just inside the flared area 10A and restrict the resin to the area between the members 22. However, some small leakage of resin about members 21 does not detrimentally effect operation of the insert.

An expandable means such as an inflatable device 30 is positioned within the central aperture passing through inner liner 10 in the assembled three part liner system 16. As previously described, the inner liner 10 is formed with beveled or flared ends 10A. The radially outward extending ends 10A serve to provide a smooth transition from the conduit to the insert and from the insert to the conduit. A strip of narrow duct tape may be wrapped around the outer rubber layer 12 adjacent the flared ends 10A to compress the layer 12 against ends 10A during filling of the system with liquid resin. However, it may also be desirable to seal the overlapping joint in liner 10 along the extent of the flared end 10A with a flexible sealant such as a room temperature vulcanizing silicone compound.

In order to further seal the flared ends 10A to prevent escape of the resin from within the area between inner liner 10 and outer layer 12, there are further provided end seal rings 22 which are formed with beveled edges 22A that are shaped to fit and conform to flared ends 10A. The rings 22 also at least partially serve to position insert system 16 on inflatable carrier device 30. The rings 22 are made of an elastic material, such as rubber, and contract with carrier device 30 so that they are removed from the insert system concurrently with carrier device 30. As shown in FIG. 2, resin is introduced into the liner system from a container 15 of pre-mixed hardenable resin through a hose 15A inserted into a port(s) 18. Alternately, the resin may be introduced through a funnel 19 inserted in a port(s) 18. The amount of resin introduced into the system 16 is selected to completely fill the space available between the liner 10 and outer layer 12. More particularly, the resin fills the valleys between the ribs 14 and saturates the matting 11.

Inflatable carrier device 30, which may be gas or water bag, is inflated using a gas or fluid pump 32, as appropriate. The pump 32 forces gas or fluid through interconnection means 31 into the inflation means 30 thereby expanding the inflatable carrier device 30 to form a water-tight mold. The uncured resin and a catalyst or hardener are mixed together and placed in the container. The funnel 19 is introduced into a port 18, compressing compressible valve 81, thereby allowing introduction of the resulting resin mixture from container 15 into the fiber matting 11. The liner system 16 with partially expanded inflation means 30 and uncured resin 15 is hereinafter referred to as insert assembly 33.

Insert assembly 33 is drawn inside the conduit (not shown) and placed proximate to a defect such as a crack, fissure or hole 2 such that the ends of the insert assembly 33 extend beyond the maximum length of the defect. The outer elastomeric layer 12 protects the uncured resin 15 in the matting material 11 from contamination, accumulation of foreign particles or disturbance during the insertion process and acts as a seal to prevent leakage of the uncured resin out of the matting material 11 through wash out before curing. The outer elastomeric layer 12 also prevents bonding between the wall of conduit 1 and the fiber matting 11.

With the assembly 33 in its desired position, the gas or fluid pump 32 is actuated to force additional gas or fluid through interconnection means 31 into the inflation device 30 to expand the insert assembly 33 such that the outer layer of the insert liner system 16 makes direct contact with the inner wall of the conduit 1. For example, the internal pressure required to maintain direct contact with the inner wall of the conduit 1 may be approximately 85 PSI for an 8 inch conduit but will vary with different size liners. It is to be appreciated that the inflation device 30 can be constructed in many different ways and can be made so as to accommodate flowing water through its center while retaining the inflated pressurized position to provide uninterrupted service through the conduit, i.e., the inflatable device may be constructed around a central tube for passing liquid through the device during installation of the insert assembly. Upon expansion of inflation device 30, the ribs 14 of inner layer 10 act to force an even distribution of the resin 15 throughout the fiber matting material 11. The outer layer 12 deforms into and seals the defects in conduit 1, thereby preventing wash out of the uncured resin from the matting layer 11, to form a strong durable and somewhat flexible inserted liner.

If desired to accelerate curing, electrical power is coupled to conductive element 13 via end terminals 20 from power generating means (not shown). Electrical current through conductive elements 13 creates heat within the insert liner system 16, and increasing the temperature of the uncured resin 15 within the matting material 11. The increased temperature causes resin 15 to cure faster. In some cases curing can be decreased by 50% with the addition of heat, from two hours to one hour.

Upon curing of the resin 15, the ribs 14 of the inner layer 10 bond with the fiber matting to produce significant added strength for the completed insert liner system 16. In addition to the benefits listed above, upon curing of the resin 15, the outer layer 12 also acts to relieve stress between conduit 1 and the completed insert liner system 16 as the conduit 1 shifts over time. This provides an added benefit of reducing the need for future repairs due to conduit movements, and forms a water tight seal to prevent ingress and egress of fluids inside and surrounding the conduit 1.

Once the resin 15 has cured, inflation device 30 is depressurized by means of reversing the pump 32, in the case of a liquid, or releasing a pressure relief valve in the case of a gas, to deflate inflation means 30, through interconnection means 31. The inflation device 30 is then withdrawn from the inserted liner system 16 thereby leaving a completed inserted liner 16 to seal the conduit 1 and provide added strength.

Figure 5:
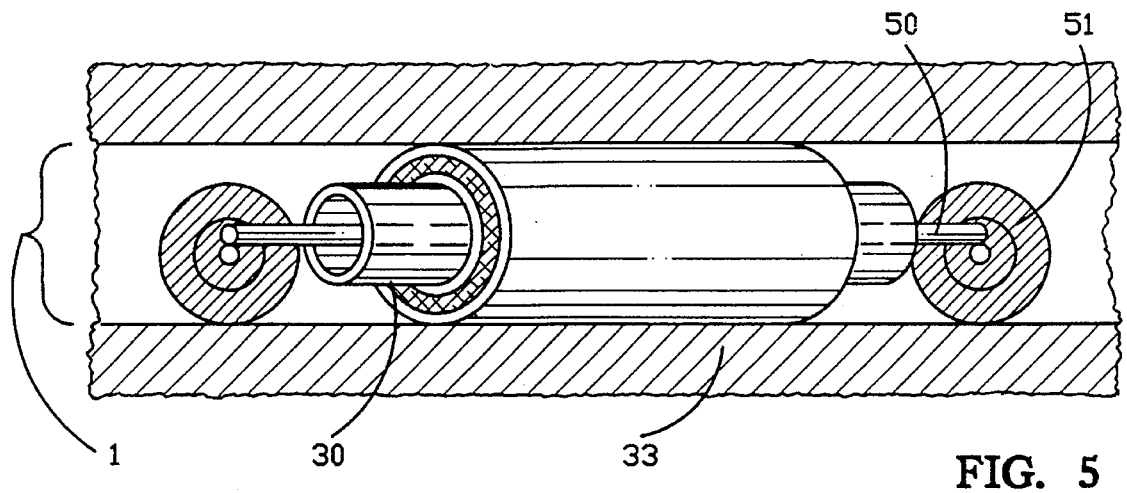
FIG. 5 is a detailed view of the three layer insert with inflation device and carrier for placement within a conduit or pipe.

Referring now to FIG. 5, in an alternate embodiment, the insert assembly 33, by way of the inflation device 30, can be attached to a carrier bar 50 that has wheels 51 placed at either end for guiding the insert assembly 33 into a conduit 1. The wheels 51 provide a means for easily inserting the insert assembly 33 into the conduit 1.

The insert liner system 16 can either be factory assembled in preselected lengths, e.g., the aforementioned 7.5 inches, or be assembled in the field from factory supplied components into sections of the same length. Alternately, multiple sections of the inner liner 10 may be placed end-to-end, wrapped with a wider segment of matting 11 and inserted into a longer length of outer rubber sleeve 12. This alternate construction allows insert assemblies of up to an indeterminate length to be constructed. Such construction creates a flexible or bendable assembly which can be drawn through curves or pipe interconnections without undue binding. Applicant has found that the resin will flow into the triangular shaped volume between adjacent ends of liners 10 and bond the liners to each other as well as forming a continuous inner liner surface. For this purpose, it is desirable to cover the outer surface of the inflation device 30 with a releasing agent, such as petroleum jelly, to prevent the resin from bonding to the device 30. It will be recognized that O-ring members 21 are not used on abutting ends of liner inserts so that the resin can flow over the flared ends 10A. The process for insertion and curing would be the same as disclosed above for on-site manufactured inserts.

While the present invention has been described and illustrated herein as embodied in a method and apparatus for repairing a specific construction of conduit, it is not limited to the details of this particular embodiment, since various modifications and structural changes are possible and contemplated by the present invention. Thus, the scope of the present invention will be determined exclusively by

What is claimed is:

1. An insert system for repairing defects in underground conduits in situ comprising:
    a tubular inner liner of stiff material having a first end and a second end and a generally smooth inner surface and a plurality of integral outer circumscribing ribs defining a plurality of valleys between said ribs;
    an outer sleeve having a first end and a second end and circumscribing said inner liner and formed of an elastomeric material;
    a mid-layer of reinforcing woven material wrapped about said inner liner within said outer sleeve, said mid-layer terminating short of said first and second ends of said inner liner and short of said first and second ends of said outer sleeve; and
    a hardenable resin saturating said mid-layer and filling said valleys, said resin bonding to said inner liner to form a structural insert wherein said outer sleeve prevents bonding between said resin saturated mid-layer and the conduit, and said outer sleeve provides a deformable elastomeric seal over substantially a full extent of said insert system against an inner surface of a conduit when the insert system is operatively positioned therein.

2. The system of claim 1 wherein said inner liner includes flared ends for providing a smooth transition from a conduit to said liner and from said liner to the conduit for fluid flowing through the conduit.

3. The system of claim 2 and including at least one port formed in said outer layer for introduction of resin into said mid-layer.

4. The system of claim 3 and including valve means operatively associated with said at least one port for sealing said port after introduction of the resin.

5. The system of claim 4 and including a lengthwise slit extending end to end of said inner liner, said inner liner being compressed to less than its normal diameter by overlapping of edges thereof adjacent said slit.

6. The system of claim 1 and including a plurality of said inner liners positioned in end to end abutting relationship, said mid-layer and said outer sleeve extending over said plurality of inner liners.

7. The system of claim 1 and including a continuous electrical element wound on said inner liner and having a pair of electrical terminals for connection to a source of electrical power for heating said hardenable resin.

8. The system of claim 7 wherein said inner liner is slit from end-to-end and said electrical element is positioned in said valleys between said ribs and crosses from one valley to an adjacent valley at said slit.

9. The system of claim 8 wherein each of said ribs includes an undercut at said slit for receiving and restraining said electrical element.

10. The system of claim 1 and including an elastomeric band circumscribing each end of said mid-layer.

11. The system of claim 10 wherein said elastomeric band comprises a seal between said inner liner and said outer sleeve.

12. The system of claim 2 and including a pair of removable end seal rings each positioned at opposite ends of said inner liner and having a surface abutting said inner liner shaped to conform with said flared ends, said end seal rings engaging an inner surface of a conduit being repaired and inhibiting escape of said resin from between said inner liner and said outer layer.

13. The system of claim 12 wherein said end seal rings comprise an elastomeric material and are sized to fit within said inner liner in a relaxed state.

14. The system of claim 4 wherein said valve means comprises a plate-like structure installed between said outer sleeve and said mid-layer, said structure having a first layer of a compressible material facing said outer sleeve at said at least one port and a second layer of a relatively stiff material adapted to maintain a planar position of an adjacent surface of the first layer.

15. The system of claim 14 wherein said valve means is held adjacent said port by staples having pointed ends protruding through said second layer toward said outer sleeve.

16. The system of claim 1 wherein said inner liner is slit axially from end-to-end and one edge of said inner liner along said slit is placed in overlapping relationship with another edge along said slit whereby said inner liner is compressible to a reduced diameter for insertion into a conduit.

17. The system of claim 16 wherein said ribs are removed adjacent said slit to enable said one and another edges to form an overlapping joint.

18. The system of claim 17 wherein said inner liner comprises polyvinyl chloride tubing.

19. The system of claim 12 wherein said end seal rings are removed from said system upon setting of said hardenable resin.

* * * * *